(12) United States Patent
Kuczera et al.

(10) Patent No.: US 7,040,991 B2
(45) Date of Patent: May 9, 2006

(54) PLUNGING CONSTANT VELOCITY JOINT FOR A PROPSHAFT TUNED FOR ENERGY ABSORPTION

(75) Inventors: Ramon Kuczera, Clarkston, MI (US); Michael Miller, White Lake, MI (US); Donald Dine, Rochester Hills, MI (US); James Lyon, Northampton (GB)

(73) Assignee: GKN Driveline North America, Inc., Auburn Hills, MI (US)

( * ) Notice: Subject to any disclaimer, the term of this patent is extended or adjusted under 35 U.S.C. 154(b) by 39 days.

(21) Appl. No.: 10/734,765

(22) Filed: Dec. 11, 2003

(65) Prior Publication Data

US 2005/0130751 A1    Jun. 16, 2005

(51) Int. Cl.
*F16D 3/227* (2006.01)

(52) U.S. Cl. .................. 464/144; 464/167; 464/906

(58) Field of Classification Search ........ 464/144–146, 464/167, 906
See application file for complete search history.

(56) References Cited

U.S. PATENT DOCUMENTS

| | | | |
|---|---|---|---|
| 3,045,456 A * | 7/1962 | Bellomo | 464/144 |
| 3,613,397 A * | 10/1971 | Okoshi | 464/144 |
| 3,696,638 A | 10/1972 | Smith et al. | |
| 3,899,898 A * | 8/1975 | Takahashi et al. | 464/144 |
| 5,118,214 A | 6/1992 | Petrzelka et al. | |
| 5,230,658 A | 7/1993 | Burton | |
| 5,320,579 A | 6/1994 | Hoffmann | |
| 5,582,546 A | 12/1996 | Welschof | |
| 5,836,825 A | 11/1998 | Yamane | |
| 5,944,612 A | 8/1999 | Schwarzler | |
| 6,033,311 A | 3/2000 | Bartlett | |
| 6,071,195 A | 6/2000 | Krude | |
| 6,171,196 B1 | 1/2001 | Welschof | |
| 6,210,282 B1 | 4/2001 | Hofmann | |
| 6,234,908 B1 | 5/2001 | Jacob | |
| 6,251,019 B1 | 6/2001 | Hofmann et al. | |
| 6,251,021 B1 | 6/2001 | Jacob | |

(Continued)

FOREIGN PATENT DOCUMENTS

GB    1327952    8/1973

(Continued)

OTHER PUBLICATIONS

SAE Universal Joint and Driveshaft Design Manual, AE-7, Society of Automotive Engineers Inc., Warrendale, PA, p. 163, T1079.S62 1979.*

(Continued)

*Primary Examiner*—Greg Binda
(74) *Attorney, Agent, or Firm*—Jennifer M. Brumbaugh; Mick A. Nylander

(57) ABSTRACT

A constant velocity joint has an outer part, an inner part, a plurality of torque transmitting balls, and a cage having windows for retaining the balls in the ball tracks of the outer and inner parts. The balls are retained in a plane by the cage and guided by corresponding pairs of outer and inner ball tracks. The outer and inner ball tracks form angles of intersection with respect to an axis where the angles are identical in size but set in opposite directions to one another. The outer part and the inner part operate in a normal axial range, there being at least one energy absorption surfaces located in the outer extended axial range or the inner extended axial range. The energy absorption surface interferes with at least one of the torque transmitting balls when the joint is operated beyond said normal axial range.

20 Claims, 4 Drawing Sheets

U.S. PATENT DOCUMENTS

| | | |
|---|---|---|
| 6,254,487 B1 | 7/2001 | Jacob |
| 6,261,184 B1 | 7/2001 | Jacob et al. |
| 6,299,544 B1 | 10/2001 | Schwarzler et al. |
| 6,350,205 B1 | 2/2002 | Kuhnhold et al. |
| 6,585,602 B1 | 7/2003 | Cermak et al. |
| 2003/0008716 A1 | 1/2003 | Boutlin |
| 2003/0045365 A1 | 3/2003 | Booker |
| 2003/0078107 A1 | 4/2003 | Margerie |
| 2005/0130750 A1* | 6/2005 | Kuczera et al. ............. 464/146 |

FOREIGN PATENT DOCUMENTS

| | | |
|---|---|---|
| JP | 05 180237 A | 11/1993 |

OTHER PUBLICATIONS

GKN Constant Velocity Products Catalog, GKN Automotive Inc., Auburn Hills, MI, p. 13, 1993.*

PCT Notification of Transmittal of the International Search Report and the Written Opinoin of the ISA, Mar. 10, 2005, 3 Pages.

PCT International Search Report by the ISA of the European Patent Office, Mar. 10, 2005, 4 Pages.

PCT Written Opinion of the ISA of the European Patent Office, Mar. 10, 2005, 5 Pages.

* cited by examiner

PLUNGING CONSTANT VELOCITY JOINT FOR A PROPSHAFT TUNED FOR ENERGY ABSORPTION

TECHNICAL FIELD

The present invention relates generally to motor vehicle propeller shafts, and more particularly concerns a constant velocity joint having improved crash-worthiness and energy absorption capabilities within a propeller shaft of a motor vehicle.

BACKGROUND OF THE INVENTION

Constant velocity joints are common components in automotive vehicles. Typically, constant velocity joints are employed where transmission of a constant velocity rotary motion is desired or required. Common types of constant velocity joints include end motion or plunging and fixed motion designs. Of particular interest is the end motion or plunging type constant velocity joints, which include a tripod joint, a double offset joint, a cross groove joint, and a cross groove hybrid. Of these plunging type joints, the tripod type constant velocity joint uses rollers as torque transmitting members, and the others use balls as torque transmitting members. Typically, these types of joints are used on the inboard (toward the center of the vehicle) on front sideshafts and on the inboard or outboard side for sideshafts on the rear of the vehicle and on the propeller shafts found in rear-wheel drive, all-wheel drive, and four-wheel drive vehicles.

Propeller shafts are commonly used in motor vehicles to transfer torque and rotational movement from the front of the vehicle to a rear axle differential such as in a rear wheel and all wheel drive vehicles. Propeller shafts are also used to transfer torque and rotational movement to the front axle differential in four-wheel drive vehicles. In particular, two-piece propeller shafts are commonly used when larger distances exist between the front drive unit and the rear axle of the vehicle. Similarly, sideshafts are commonly used in motor vehicles to transfer torque from a differential to the wheels. The propeller shaft and sideshafts are connected to their respective driving input and output components by a joint or series of joints. Joint types used to connect the propeller shaft and sideshafts interconnecting shafts include Cardan, Rzeppa, tripod and various ball type joints.

In addition to transferring torque and rotary motion, in many automotive vehicles the propeller shaft and axle drives allow for axial motion. Specifically, axial motion is designed into two-piece propeller shafts by using an end motion or plunging type constant velocity joint.

Besides transferring mechanical energy and accommodating axial movement, it is desirable for plunging constant velocity joints to have adequate crash-worthiness. In particular, it is desirable for the constant velocity joint to be shortened axially preventing the propeller shaft from buckling, penetrating the passenger compartment, or damaging other vehicle components in close proximity of the propeller shaft. In many crash situations, the vehicle body shortens and deforms by absorbing energy that reduces the acceleration; further protecting the occupants and the vehicle. As a result, it is desirable for the propeller shaft be able to reduce in length during the crash, allowing the constant velocity joint to travel beyond its operational length. It is also desirable for the constant velocity joint within the propeller shaft to absorb a considerable amount of the deformation energy during the crash. Reduction of the propeller shaft length during a crash situation is often achieved by having the propeller shaft telescopically collapse and energy absorb thereafter.

In telescopic propeller shaft assemblies, the joint must translate beyond the constant velocity joint limitation before the telescopic nature of the propeller shaft is effectuated. In some designs, the propeller shaft must transmit the torque as well as maintain the ability to telescope. In other designs, the telescopic nature of the joint only occurs after destruction of the joint, joint cage or some type of joint retaining ring. Still in other designs, the joint must first translate the balls out of and off the race area before the telescopic attribute can be had for axial joint displacement. The limitation of the telescopic ability is that the constant velocity joint must be compromised before axial displacement can occur in a crash situation. Therefore, there is a desire to have a constant velocity joint that can accommodate the axial displacement during a crash.

Furthermore, the energy absorption only occurs after the functional limit or end of the constant velocity joint has been surpassed. This causes a time delay in the energy absorption ability of the propeller shaft. Then and only then, the energy absorption is accomplished and typically has a force step or impulse energy absorption pattern. After the initial energy absorption, typically, there is no further energy absorption in the propeller shaft. In another situation there is further energy absorption, but only after the joint balls successfully translate off the joint race and onto the propeller shaft. Therefore, there is a desire to have a constant velocity joint that has a controlled or tuned force energy absorption profile over a range of the joint's axial travel distance, especially when the normal operational range of the joint has been surpassed.

It would be advantageous to have the above-mentioned features in the cross groove joint. The cross groove constant velocity joint is commonly know by automotive manufactures and suppliers as a VL type joint and the invention, here below, relates to this type of joint. A VL joint is used for accommodating rotary and axial displacements in a propeller shaft of a motor vehicle and for connecting a drive unit to a rear axle gearbox, having at least two articulatably connected shaft portions. The joint has an outer joint part with outer ball tracks, an inner joint part with inner ball tracks, a plurality of torque transmitting balls each guided in outer and inner ball tracks associated with one another. The associated outer ball tracks on the one hand and inner ball tracks on the other hand, forming angles of intersection in respect of the central axis of the joint, which are of identical size but are set in opposite directions. The balls are held in a constant velocity plane when the joint is axially displaced or articulated by a ball cage, which is provided with a plurality of cage windows each accommodating one of the balls. The outer joint part is connected to a hollow shaft and the inner joint part is connected to a connecting shaft allowing axial displacement.

SUMMARY OF THE INVENTION

The present invention is directed toward a constant velocity joint for use in a vehicle driveline having at least one energy absorption element for improved crash-worthiness and energy absorption. In particular, at least one energy absorption element of the constant velocity joint, described herein, is tuned to control joint energy absorption for axial displacement beyond the normal axial travel range of the joint.

The present invention provides an energy absorbing plunging constant velocity joint for improved crash-worthiness. In particular, a constant velocity joint has an outer joint part, an inner joint part, a plurality of torque transmitting balls, and a ball cage having cage windows for retaining the torque transmitting balls in the outer and the inner ball tracks of the outer and the inner joint parts. The torque transmitting balls are retained in a constant velocity plane by the ball cage and guided by corresponding pairs of the outer and the inner ball tracks. The outer and the inner ball tracks form angles of intersection with respect to an axis where the angles are identical in size but set in opposite directions to one another. The outer joint part and the inner joint part operate in a normal axial range when transmitting torque in a propeller shaft. There is an inner extended axial range and an outer extended axial range, which can accommodate axial motion when the inner joint part and the outer joint part are thrust beyond the normal axial range. There is at least one energy absorption surface located in the outer extended axial range or in the inner extended axial range. The energy absorption surface interferes with at least one of the torque transmitting balls when the joint is operated beyond said normal axial range, allowing the joint to absorb the thrust energy.

An advantage of the present invention is that the constant velocity joint absorbs energy within an extended axial range when the joint is thrust beyond its normal axial range. The present invention itself, together with further objects and intended advantages, will be best understood by reference to the following detailed description, taken in conjunction with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention.

In the drawings.

DETAILED DESCRIPTION OF THE INVENTION

In the following description, various operating parameters and components are described for one constructed embodiment. These specific parameters and components are included as examples and are not meant to be limiting.

While the invention is described with respect to an apparatus having improved crash-worthiness within a propeller shaft of a vehicle, the following apparatus is capable of being adapted for various purposes including automotive vehicle drive axles or other vehicles and non-vehicle applications which require collapsible propeller shaft assemblies.

Figure 1:
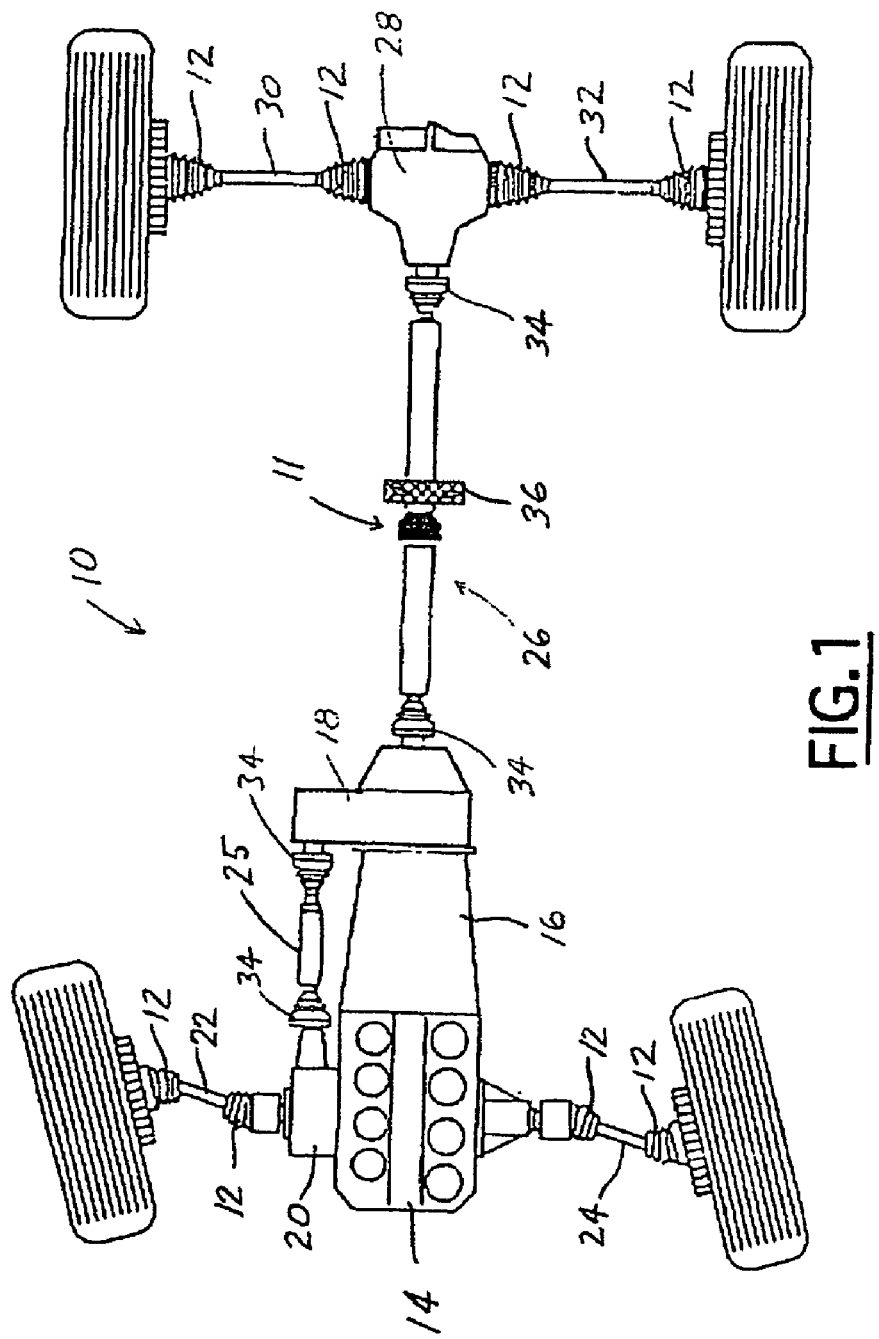
FIG. 1 shows a plan view of a four-wheel drive vehicle driveline in which the present invention may be used to advantage.

Referring now to FIG. 1, there is shown a plan view of four-wheel drive vehicle driveline 10 wherein a constant velocity joint 11 in accordance with the present invention may be used to advantage. The driveline shown in FIG. 1 is typical for a four-wheel drive vehicle, however, it should be noted that the constant velocity joint 11 of the present invention can also be used in rear wheel drive only vehicles, front wheel drive only vehicles, all wheel drive vehicles, and four-wheel drive vehicles. The vehicle driveline 10 includes an engine 14 that is connected to a transmission 16 and a power takeoff unit such as a transfer case 18. The front differential 20 has a right hand sideshaft 22 and left hand sideshaft 24, each of which are connected to a wheel and deliver power to the wheels. On both ends of the right hand front sideshaft 22 and the left hand front sideshaft 24 are constant velocity joints 12. A front propeller shaft 25 connects the front differential 20 to the transfer case 18. A propeller shaft 26 connects the transfer case 18 to the rear differential 28, wherein the rear differential 28 is coupled to a rear right hand sideshaft 30 and a rear left hand sideshaft 32, each of which is connected to a respective wheel. constant velocity joints 12 are located on both ends of the sideshafts 30, 32 that connect the rear wheels to the rear differential 28. The propeller shaft 26, shown in FIG. 1, is a two-piece propeller shaft. Each end includes a rotary joint 34 which may comprise a cardan joint or any one of several types of constant velocity joints or non-constant velocity joints. Between the two pieces of the propeller shaft 26 is a high speed constant velocity joint 11 in accordance with the present invention as well as a support 36 such as an intermediate shaft bearing. The constant velocity joints 11, 12, 34 transmit power to the wheels through the propeller shaft 26, front propeller shaft 25 and sideshafts 22, 24, 30, 32 even if the wheels or the shafts 25, 26 have changing angles due to the steering or raising or lowering of the suspension of the vehicle. The constant velocity joints 11, 12, 34 may be any of the standard types known and used to advantage, such as a plunging tripod, a cross-groove joint, a cross-groove hybrid joint, or a double offset joint or any other type of constant velocity joints.

Figure 2:
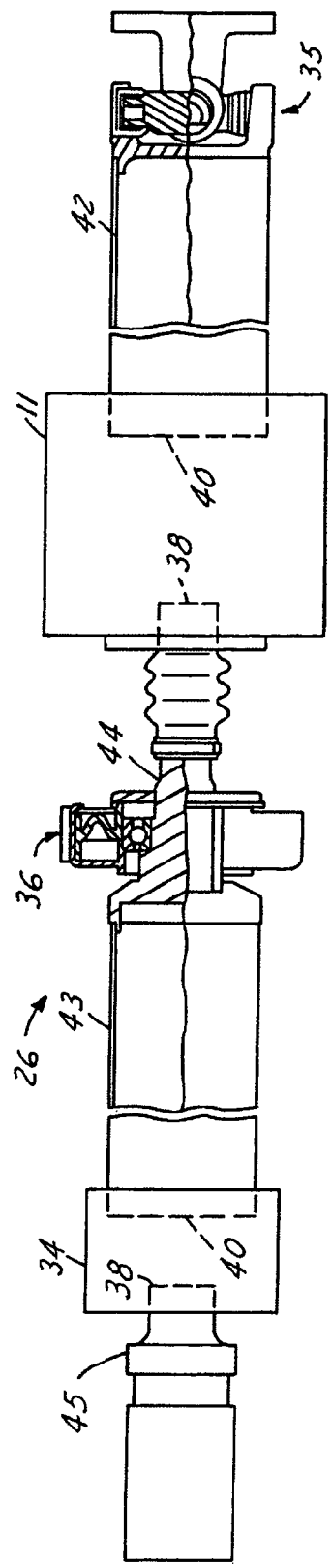
FIG. 2 shows a half-sectional view of a vehicle propeller shaft assembly comprising one or more constant velocity joints in accordance with one embodiment of the present invention.

FIG. 2 shows a half-sectional view of a vehicle propeller shaft 26 assembly comprising one or more constant velocity joints 11, 34 in accordance with one embodiment of the present invention such as shown in FIG. 1. The propeller shaft 26 assembly may include one, two or a combination of constant velocity joints 11, 34. The constant velocity joint can be of a monobloc, disc, flanged, or other styles of design known to those in the art. The propeller shaft 26 assembly transfers torque from the transmission 16 to the rear differential 28 by way of the propeller shaft 26. The constant velocity joints 11, 34 are axially plungeable. The constant velocity joints 11, 34 have an inner joint part 38 and an outer joint part 40. The outer joint part 40 of constant velocity joint 11 is connected to one end of a hollow shaft 42 by, for example, a friction weld. The hollow shaft 42 is defined by a cylindrical shell having an inner diameter that is smaller than its outer diameter and two open ends. The other end of the hollow shaft 42 is connected to a rotary joint 35 that is connectable to a rear differential 28 or a transmission 16 depending upon the directional orientation of propeller shaft 26. Into the inner joint part 38 there is inserted a connecting shaft 44 which, at a certain distance from the joint 11, is supported by a shaft bearing 36.

Similarly, in combination or alternatively, the outer joint part 40 of constant velocity joint 34 is connected to one end of a hollow shaft 43 by, for example, a bolted connection. The other end of the hollow shaft 43 is connected to a shaft bearing 36 on the opposite side of connecting shaft 44. Into the inner joint part 38 there is inserted a connecting shaft 45 which is connectable to a transmission 16 or a rear differential 28 depending upon the directional orientation of propeller shaft 26. The propeller shaft 26 assembly transfers torque from the transmission 16 to the rear differential 28 by way of the propeller shaft 26.

In addition to torque transfer, the propeller shaft 26 can accommodate axial and angular displacements within the constant velocity joints 11, 34, where axial movement and articulation of the hollow shafts 42, 43 is relative to the connecting shafts 44, 45. Axial movement is relative to the shafts centerline. In certain crash situations, however, the connecting shafts 44, 45 will move, and thrust axially toward the shafts 42, 43, beyond the joints normal operating range while engaging a tuned energy absorption surface. The tuned energy absorption surface extends over an extended axial range of the constant velocity joints 11, 34. Energy may be absorbed until the extended axial range is exceeded and the joint parts are released into the hollow shafts 42, 43 or are impeded by the hollow shafts 42, 43. The required thrust for axial movement may be increased or decreased by increasing or decreasing the amount of interference caused by the energy absorption surface.

Figure 3:
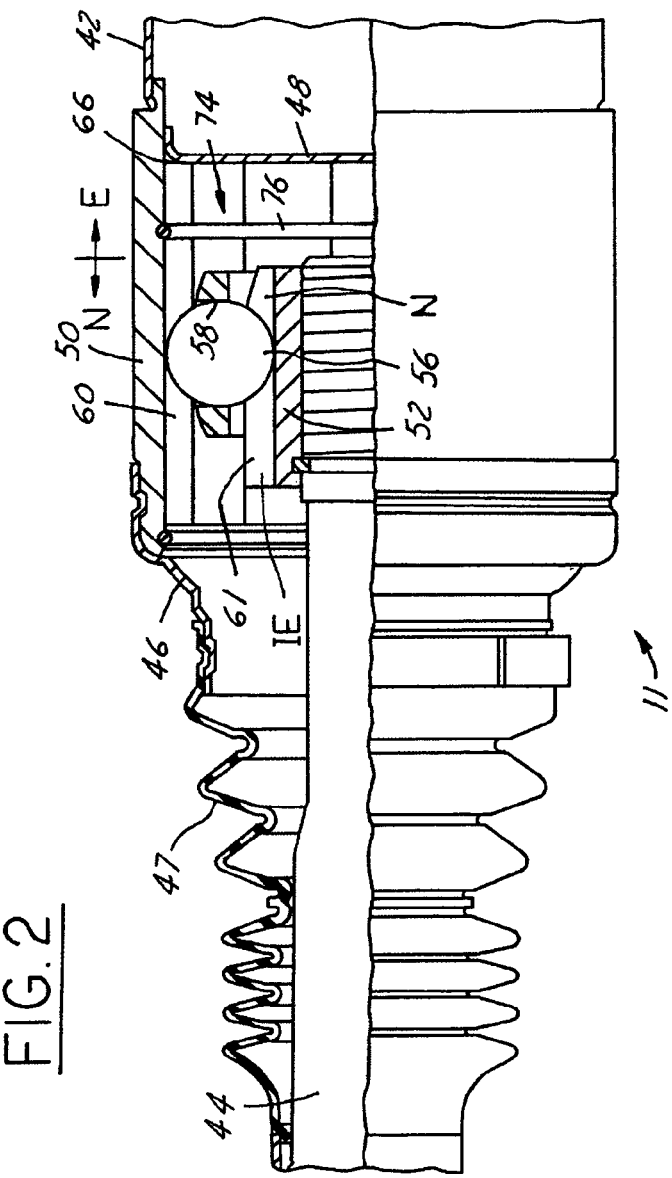
FIG. 3 shows a half-sectional view of a constant velocity joint in accordance with one embodiment of the present invention in a propeller shaft assembly.

FIG. 3 shows a half-sectional view of a constant velocity joint 11 in accordance with one embodiment of the present invention in a propeller shaft assembly. The joint 11 is an axially plungeable constant velocity joint of the cross-groove type. For purposes of clarity, the cross-groove joints of FIGS. 3–7 are shown with exaggerated outer joint part ball track lengths such that the energy absorption features discussed herein can be more easily illustrated. The constant velocity joint 11 comprises an outer joint part 50, an inner joint part 52, a ball cage 54 and more than one torque transmitting balls 56 each held in a cage window 58. The outer joint part 50 comprises a cylindrical open end 66 located proximate to the hollow shaft 42, outer ball tracks 60 which longitudinally extend over the length of the outer joint part 50, having a normal axial range N and an outer extended axial range E. The inner joint part 52 comprises inner ball tracks 61 which longitudinally extend over the length of the inner joint part 52, having a normal axial range N and an inner extended axial range IE. The inner extended axial range IE of the inner joint part 52 is correspondingly positioned in opposite direction, about the normal axial range N, from the outer extended axial range E of the outer joint part 50. Each inner ball track 61 is associated with a corresponding outer ball track 60 forming angles of intersection with respect to an axis. The angles are identical in size but set in opposite directions and corresponding to the inner ball tracks 61 and the outer ball tracks 60. The length of each inner ball track 61 is commensurate with the length of each outer ball track 60, although shown in the figure as having different lengths for clarity of the inventive aspects. Alternatively, it can be recognized that the inner ball tracks 61 and the outer ball tracks 60 can have varying lengths, the shorter of which correspondingly commensurate to the angles of intersection of the longer of the two. Thus, the outer joint part 50 and the inner joint part 52 are driveably connected through the torque transmitting balls 56 located in the ball tracks 60, 61; there being one torque transmitting ball 56 for each corresponding pair of ball tracks 60, 61. The torque transmitting balls 56 are positioned and maintained in a constant velocity plane by the ball cage 54, wherein the ball cage 54 is located between the two joint parts 50, 52. The constant velocity joint 11 permits axial movement since the ball cage 54 is not positionably engaged to the inner joint part 52 and the outer joint part 50.

The outer joint part 50 is connected to a hollow shaft 42 that is fixed to the outer joint part by, for example, a friction weld. The hollow shaft 42 may also be flanged and connected to the outer joint part by way of, for example, bolts.

Into the inner joint part 52 there is inserted a connecting shaft 44. A plate cap 46 is secured to the outer joint part 50. A convoluted boot 47 seals the plate cap 46 relative to the connecting shaft 44. The other end of the joint 11 at the cylindrical open end 66, i.e., towards the hollow shaft 42, is sealed by a grease cover 48. In addition, the cover 48 may provide some energy absorption should the connecting shaft 44 be thrust beyond the extended axial range E of constant velocity joint 11. The constant velocity joint 11 is designed to operate in it normal axial range N until, however, compression from a crash or an unintended thrust is applied forcing the inner joint part 52, the ball cage 54, and the torque transmitting balls 56 into or through the extended axial ranges E, IE of both joint components.

In this embodiment of the present invention, the joint has a tuned energy absorption surface 74, which is a circlip 76. The circlip 76 is circumferentially located in the outer extended axial range E and coupled to the outer joint part 50. The circlip 76, in this embodiment, is an annular ring, made from a deformable material, preferably metal or plastic, and positionable in the outer joint part 50 so as to reside in the outer ball tracks 60. When the connecting shaft 44 along with the inner joint part 52, the torque transmitting balls 56 and the ball cage 54 are thrust, as a result of an unintended force, such as a crash, beyond the normal axial range N and into the outer extended axial range E of the joint 11, the torque transmitting balls 56 will interfere with or be impeded by the circlip 76. The impediment of the circlip 76 causes an increase in the thrust required for axial motion allowing energy to be absorbed by the constant velocity joint 11 and the propeller shaft 26. The circlip 76 can be tuned to achieve different force levels, allowing for design of a controlled energy absorption profile within the constant velocity joint 11. The tuning may be accomplished by changing the size, the shape, the material, or the location of the circlip 76. There may also be more than one circlip 76 located within the outer extended axial range E of the constant velocity joint 11.

In addition or alternatively, the circlip 76 may be circumferentially located in the inner extended axial range IE and coupled to the inner joint part 52 (not shown in FIG. 3). When the connecting shaft 44 along with the inner joint part 52, the torque transmitting balls 56 and the ball cage 54 are thrust, as a result of an unintended force, such as a crash, beyond the normal axial range N and into the inner extended axial range IE of the joint 11, the torque transmitting balls 56 will interfere with or be impeded by the circlip 76. The impediment of the circlip 76 causes an increase in the thrust required for axial motion allowing energy to be absorbed by the constant velocity joint 11 and the propeller shaft 26.

Thus, under normal operating conditions, the torque transmitting balls 56 will operate in the normal axial range N of the constant velocity joint 11. In certain crash situations, however, the connecting shaft 44 along with the inner part 52, the ball cage 54 and the torque transmitting balls 56 will be thrust toward the hollow shaft 42 allowing track and bore energy to be absorb along the outer extended axial range E or the internal extended axial range IE caused by the impediment of the circlip 76 upon the outer joint part 50 or inner joint part 52, respectfully. When the joint is positioned in the outer extended axial range E, it is correspondingly positioned in the inner extended axial range IE. It is contemplated that the circlip 76 could be a foreign body, having the same energy absorbing effect as the ring given in this embodiment, residing upon the outer extended axial range E or inner extended axial range IE absorbing plastic energy.

Figure 4:
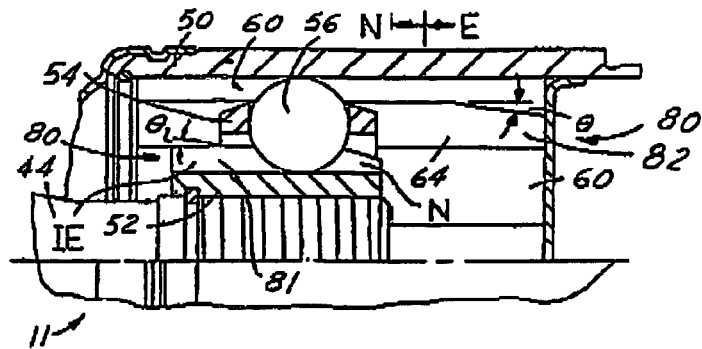
FIG. 4 shows a partial view of a constant velocity joint in accordance with alternative embodiments of the present invention.

FIG. 4 shows a partial view of a constant velocity joint in accordance with alternative embodiments of the present invention. In this embodiment, there is a tuned energy absorption surface 80, which is a bore surface 82. The bore surface 82 is circumferentially located in the extended axial range E, has an inclination θ and is coupled to the inner bore 64 of the outer joint part 50 between any two outer ball tracks 60. In addition to or in the alternative, the bore surface 82 can have multiple inclinations, stepped inclination, or variable inclination. The bore surface 82 may be located between any set of one or more outer ball tracks 60 or upon the entire inner bore surface 64 in the outer extend axial range E. The bore surface 82 may be manufactured by layering, i.e. welding, material upon the inner bore surface 64 of the outer joint part 50 or by undercutting, while machining, the inner bore surface 64. One embodiment contemplates the bore surface 82 to be manufactured from the same material as the outer joint part 50 by reducing the inner bore 64 diameter and forming an inclination θ in the outer extended axial range E during the machining process. However, one in the trade would recognize that the bore surface 82 could be accomplished, among other ways, by tacking, staking, or riveting a material upon the inner bore 64. Thus, when the connecting shaft 44 along with the inner joint part 52, the torque transmitting balls 56, and the ball cage 54 are thrust, as a result of an unintended force, such as a crash, beyond the normal axial range N and into the outer extended axial range E of the joint 11, the ball cage 54 will interfere with or be impeded by the bore surfaces 82. The impediment of the bore surfaces 82 causes an increase in the thrust required for axial motion allowing energy to be absorbed by the constant velocity joint 11 and the propeller shaft 26. The bore surfaces 82 can be tuned to achieve different force levels, allowing for design of a controlled energy absorption profile within the constant velocity joint 11. The tuning may be accomplished by changing the size, the shape, the material, or the location of the bore surfaces 82.

In addition or alternatively, the energy absorption surface 80 may be an inner energy absorption surface 81 located in the inner extended axial range IE on the outer face 62 of the inner joint part 52. When the connecting shaft 44 along with the inner joint part 52, the torque transmitting balls 56, and the ball cage 54 are thrust, as a result of an unintended force, such as a crash, beyond the normal axial range N and into the inner extended axial range IE of the joint 11, the ball cage 54 will interfere with or be impeded by the inner energy absorption surfaces 81. The impediment of the inner energy absorption surfaces 81 causes an increase in the thrust required for axial motion allowing energy to be absorbed by the constant velocity joint 11 and the propeller shaft 26.

Thus, under normal operating conditions, the ball cage 54 will operate in the normal axial range N of the constant velocity joint 11. In certain crash situations, however, the connecting shaft 44 along with the inner part 52, the ball cage 54 and the torque transmitting balls 56 will be thrust toward the hollow shaft 42 allowing bore energy to be absorb along the outer extended axial range E and or the internal extended axial range IE caused by the impediment of the energy absorption surface 80 upon the outer joint part 50 or inner joint part 52, respectfully.

Any number of inner energy absorption surfaces 81 or bore surfaces 82 may be combined with any number of circlips 76, as in FIG. 3, in the outer extended axial range E or the inner extended axial range IE of the constant velocity joint 11 to achieve a tuned and controlled energy absorption characteristic.

Figure 5A:
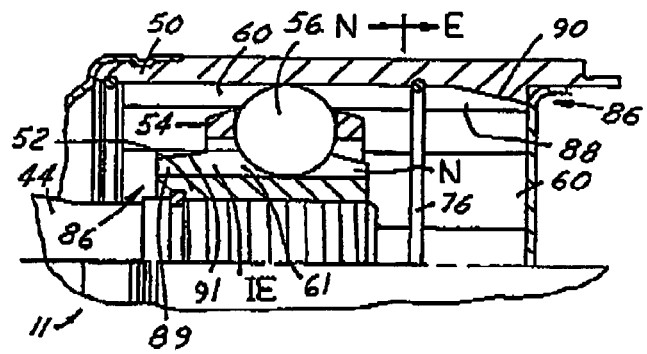
FIGS. 5A and 5B show a partial view of a constant velocity joint in accordance with alternative embodiments of the present invention.
Figure 5B:
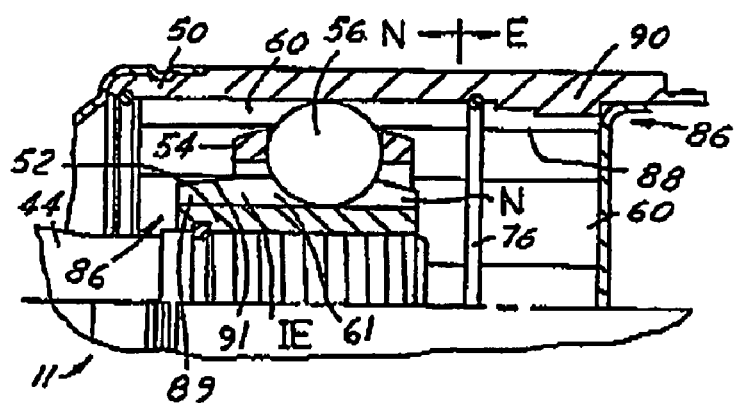

FIG. 5A shows a partial view of a constant velocity joint in accordance with an alternative embodiment of the present invention. In this embodiment, there is a tuned energy absorption surface 86, which is a track surface 88. The track surface 88 has a taper 90 and is longitudinally located in the outer extended axial range E of an outer ball track 60 of the outer joint part 50. There can be one or more track surfaces 88 located on anyone of the other outer ball tracks 60. The taper 90 may extend linearly over the outer extended axial range E as shown in the layout view of FIG. 6. Alternatively, the track surface may have a variable taper or a stepped taper of increasing or decreasing size (FIG. 5B). Thus, when the connecting shaft 44 along with the inner joint part 52, the torque transmitting balls 56, and the ball cage 54 are thrust, as a result of an unintended force, such as a crash, beyond the normal axial range N and into the outer extended axial range E of the joint 11, the torque transmitting balls 56 will interfere with or be impeded by the track surface 88. The impediment of the track surface 88 causes an increase in the thrust required for axial motion allowing energy to be absorbed by the constant velocity joint 11 and the propeller shaft 26. The track surface 88 can be tuned to achieve different force levels, allowing for the design of a controlled energy absorption profile within the constant velocity joint 11. The tuning may be accomplished by changing the size, the shape, the material, or the location of the track surface 88. The circlips 76 is combined with the track surface 88 as shown in FIG. 5A is optional and is not required.

In addition or in the alternative, the track surface 89 having a taper 91 is longitudinally located in the inner extended axial range IE of an inner ball track 61 of the inner joint part 52. There can be one or more track surfaces 89 located on anyone of the other inner ball tracks 61. The taper 91 may extend linearly over the inner extended axial range IE as shown in the layout view of FIG. 7. Alternatively, the track surface may have a variable taper or a stepped taper of increasing or decreasing size (FIG. 5B). Thus, when the connecting shaft 44 along with the inner joint part 52, the torque transmitting balls 56, and the ball cage 54 are thrust, as a result of an unintended force, such as a crash, beyond the normal axial range N and into the inner extended axial range IE of the joint 11, the torque transmitting balls 56 will interfere with or be impeded by the track surface 89. The impediment of the track surface 89 causes an increase in the thrust required for axial motion allowing energy to be absorbed by the constant velocity joint 11 and the propeller shaft 26.

Thus, under normal operating conditions, the torque transmitting balls 56 will operate in the normal axial range N of the constant velocity joint 11. In certain crash situations, however, the connecting shaft 44 along with the inner joint part 52, the ball cage 54 and the torque transmitting balls 56 will be thrust toward the hollow shaft 42 allowing track energy to be absorb along the outer extended axial range E and or the internal extended axial range IE caused by the impediment of the track surface 88, 89 upon the outer joint part 50 or inner joint part 52, respectfully. As is evident from the figures, the track surfaces 88, 89 may also interfere with the ball cage 54 in the extended ranges E, IE.

The one or more track surfaces 88, 89 the one or more circlips 76, the one or more inner energy absorption surfaces 81 and the one or more bore surfaces 82 are combinable to achieve a controlled and tuned energy absorption rate when the constant velocity joint 11 is operated beyond the normal axial range N. The track surfaces 88, 89 may be made from the same material piece as the outer joint part or inner joint part.

Figure 6:
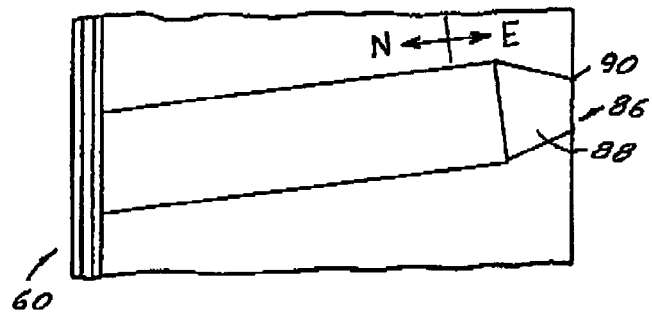
FIG. 6 shows a layout view of an outer ball track according to one embodiment of the present invention.
Figure 7:
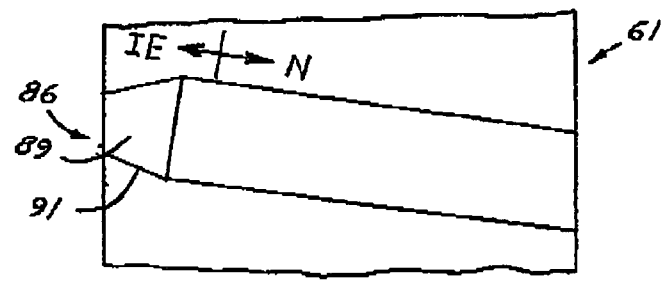
FIG. 7 shows a layout view of an inner ball track according to one embodiment of the present invention.

FIG. 6 shows a layout view of an outer ball track 60 according to one embodiment of the present invention. The layout view is representative of an outer ball track 60 having a track surface 88 with a taper 90 located in the extended axial range E of a constant velocity joint 11. FIG. 7 shows a layout view of an inner ball track 61 according to one embodiment of the present invention. The layout view is representative of an inner ball track 61 having a track surface 89 with a taper 91 located in the inner extended axial range IE of a constant velocity joint 11.

From the foregoing, it can be seen that there has been brought to the art a new and improved crash-worthy constant velocity joint. While the invention has been described in connection with one or more embodiments, it should be understood that the invention is not limited to those embodiments. On the contrary, the invention covers all alternatives, modifications, and equivalents as may be included within the spirit and scope of the appended claims.

What is claimed is:

1. An energy absorbing plunging constant velocity joint comprising:
   an outer joint part defining an axis and having a plurality of outer ball tracks including an outer extended axial range;
   an inner joint part defining an axis and having a plurality of inner ball tracks including an inner extended axial range;
   a plurality of torque transmitting balls each guided in a corresponding pair of said outer and inner ball tracks through a normal and extended axial range, wherein each corresponding pair of said inner ball tracks and said outer ball tracks are angled with respect to their respective part axis, said angles being identical in size but set in opposite directions;
   a ball cage having a plurality of cage windows each accommodating one of said balls and which hold said balls in a plane when said torque transmitting balls are in communication with said inner ball tracks and said outer ball tracks; and
   one or more energy absorption surfaces distal to the normal axial range and located within the outer extended axial range upon said outer joint part or the inner extended axial range upon said inner joint part, wherein the energy absorption surface interferes with at least one of the plurality of torque transmitting balls when said joint is operated beyond said normal axial range.

2. The joint according to claim 1, wherein one of the energy absorption surfaces is a circlip.

3. The joint according to claim 2, wherein the circlip is made from a deformable material.

4. The joint according to claim 3, wherein the deformable material is metal.

5. The joint according to claim 3, wherein the deformable material is plastic.

6. The joint according to claim 2, wherein the circlip is a ring.

7. The joint according to claim 1, wherein the outer joint part further comprises a cylindrical open end located adjacent the outer extended axial range and distal to the normal axial range of the outer joint part and a grease cover sealingly attached to the cylindrical open end.

8. The joint according to claim 7, wherein the grease cover is displaceable when the joint has axial travel beyond the outer extended axial range.

9. An energy absorbing plunging constant velocity joint comprising:
   an outer joint part defining an axis and having a plurality of outer ball tracks including an outer extended axial range;
   an inner joint part defining an axis and having a plurality of inner ball tracks including an inner extended axial range;
   a plurality of torque transmitting balls each guided in a corresponding pair of said outer and inner ball tracks through a normal and extended axial range, wherein each corresponding pair of said inner ball tracks and said outer ball tracks are angled with respect to their respective part axis, said angles being identical in size but set in opposite directions;
   a ball cage having a plurality of cage windows each accommodating one of said balls and which hold said bails in a plane when said torque transmitting balls are in communication with said inner ball tracks and said outer ball tracks; and
   one or more energy absorption surfaces distal to the normal axial range and located within the outer extended axial range upon said outer joint part or the inner extended axial range upon said inner joint part, wherein the energy absorption surface interferes with said ball cage or with at least one of the plurality of torque transmitting balls when said joint is operated beyond said normal axial range.

10. The joint according to claim 9, wherein one of the energy absorption surfaces is a bore surface.

11. The joint according to claim 10, wherein the bore surface has at least one inclination, stepped inclination or variable inclination.

12. The joint according to claim 10, wherein the bore surface is made from the same material piece as the outer joint part or the inner joint part.

13. The joint according to claim 9, wherein one of the energy absorption surfaces is a track surface.

14. The joint according to claim 13, wherein the track surface has one or more tapers or a stepped taper.

15. The joint according to claim 14, wherein the track surface is made from the same material piece as the outer joint part or the inner joint part.

16. The joint according to claim 9, wherein the outer joint part further comprises a cylindrical open end located adjacent the outer extended axial range and distal to the normal axial range of the outer joint part and a grease cover sealingly attached to the cylindrical open end.

17. The joint according to claim 16, wherein the grease cover is displaceable when the joint axially travels beyond the outer extended axial range.

18. The joint according to claim 9 further comprising one or more circlip energy absorption surfaces.

19. A propeller shaft assembly for a vehicle having an enemy absorbing plunging constant velocity joint comprising:
   an outer joint part defining an axis and having a plurality of outer ball tracks including an outer extended axial range;

an inner joint part defining an axis and having a plurality of inner ball tracks including an inner extended axial range;

a plurality of torque transmitting balls each guided in a corresponding pair of said outer and inner ball tracks through a normal and extended axial range, wherein each corresponding pair of said inner ball tracks and said outer ball tracks are angled with respect to their respective part axis, said angles being identical in size but set in opposite directions;

a ball cage having a plurality of cage windows each accommodating one of said balls and which hold said balls in a plane when said torque transmitting balls are in communication with said inner ball tracks and said outer ball tracks; and one or more energy absorption surfaces distal to the normal axial range and located within the outer extended axial range upon said outer joint part or the inner extended axial range upon said inner joint part, wherein the energy absorption surface interferes with said ball cage or with at least one of the plurality of torque transmitting balls when said joint is operated beyond said normal axial range;

a hollow shaft connected to said outer joint part; and a connecting shaft connected to said inner joint part, wherein the hollow shaft is configured to receive the connecting shaft, the inner joint part, the bail cage and the torque transmitting balls when said joint is operated beyond the extended axial range.

20. The joint according to claim 19, wherein the outer joint part further comprises a cylindrical open end located adjacent the outer extended axial range and distal to the normal axial range of the outer joint part and a grease cover sealingly attached to the cylindrical open end, wherein the grease cover is displaceable when the joint axially travels beyond the outer extended axial range.

* * * * *